Aug. 11, 1942.   L. A. DE MORE   2,292,365
REFRIGERATING APPARATUS
Filed May 29, 1939
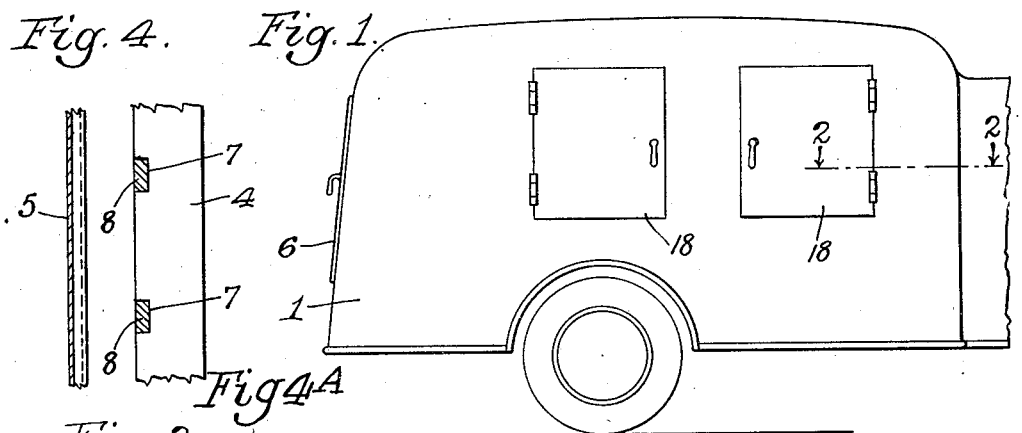
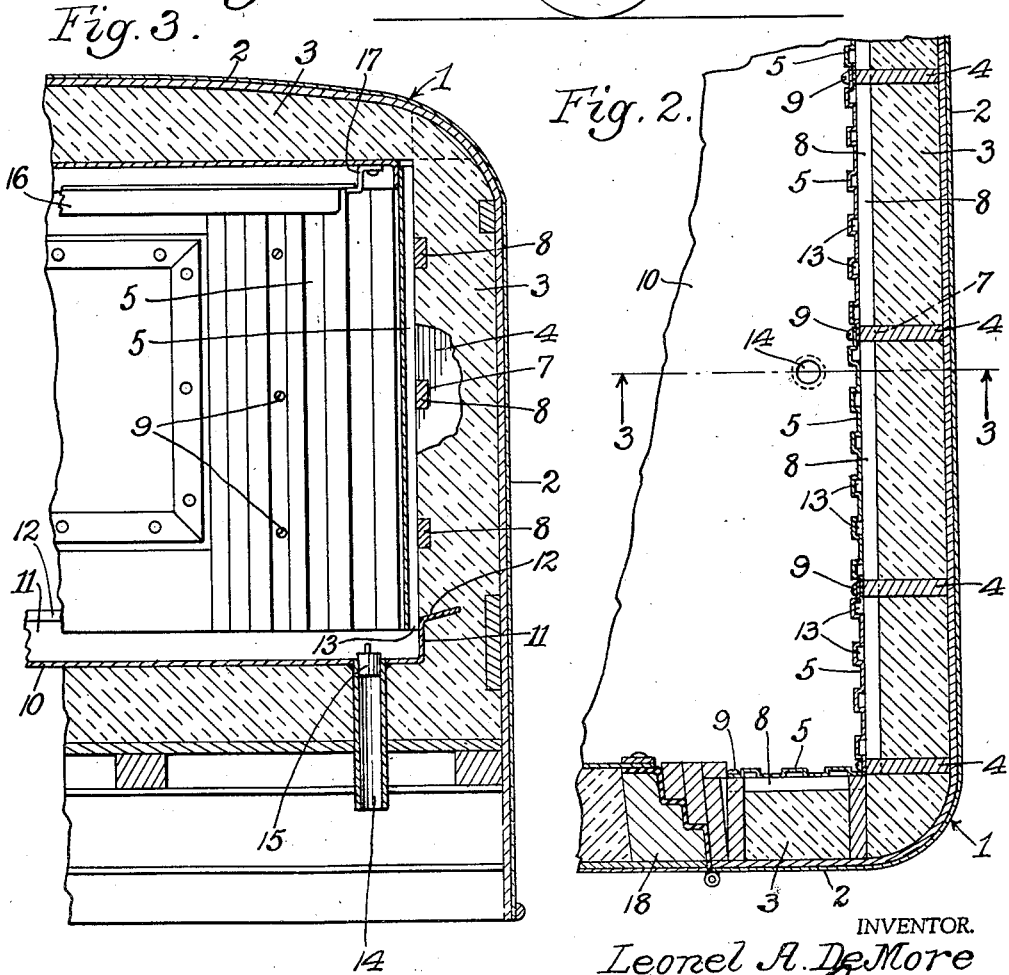
INVENTOR.
Leonel A. DeMore
BY Parker V Carter
ATTORNEYS Patented Aug. 11, 1942

2,292,365

UNITED STATES PATENT OFFICE 2,292,365

REFRIGERATING APPARATUS

Leonel A. De More, Oak Park, Ill.

Application May 29, 1939, Serial No. 276,359

9 Claims. (Cl. 62—89)

This invention relates to improvements in refrigerating apparatus and has for its object to provide a new and improved apparatus of this description.

The invention has as a further object to provide a refrigerating apparatus particularly adapted to be used in trucks. The invention has as a further object to provide a refrigerating apparatus for trucks which prevents the moisture which gets into the insulation from injuring the insulation and the truck structure. The invention has as a further object to provide a refrigerating apparatus for use in trucks by means of which moisture which penetrates the insulation which forms a part of the device, will be removed therefrom.

The invention has as a further object to provide a refrigerating apparatus for use in trucks which prevents deterioration of the insulation material and the body of the truck, thereby greatly lengthening the efficiency and life of the device. The invention has as a further object to provide a refrigerating apparatus for trucks which will properly take care of the moisture which enters the insulation on the inside of the body of the truck.

The invention has as a further object to provide a refrigerating apparatus provided with a removable liner on the inside of the body of the truck which covers the insulating material and which can be removed to dry out the insulating material if it becomes wet.

The invention has other objects which are more particularly pointed out in the accompanying description.

Referring now to the drawing,

Fig. 1 is a side view of a truck containing the refrigerating apparatus embodying the invention;

Fig. 2 is an enlarged sectional view taken on line 2—2 of Fig. 1;

Fig. 3 is an enlarged sectional view taken on line 3—3 of Fig. 2; and

Fig. 4 is a detailed view showing a portion of the liner in section; Fig. 4A is a detailed view showing the frame members to which the liner is attached.

Like numerals refer to like parts throughout the several figures.

I have illustrated in the drawing a refrigerating truck 1 which may be of any desired construction and size. This truck has an outer wall 2. Inside of this wall, so as to completely surround the space therein, there is provided insulating material 3 which may be of any suitable kind or form. There are preferably provided vertically extending frame pieces 4 for the body, and the insulating material where these frame pieces are provided, is located in between the frame pieces.

There is a lining on the inside of the body which may be of any suitable material. I prefer to provide a corrugated lining. This lining is also preferably made of metal and made in sections 5 which may be separately attached and removed. By having the lining in sections, it can be easily inserted and withdrawn through the door 6. The lining may be mounted in position in any desired manner. In the drawings I have illustrated one method of doing this. In this construction, the frame members 4 are provided with notches 7. Fitting in these notches and extending from one frame piece to the other are the supporting members 8. The liner sections 5 are attached to these supporting members. As herein shown, the edges of the adjacent liner sections overlap and there are fastening devices 9, see Figs. 2 and 3, which pass therethrough and into the supporting members.

In the bottom of the truck there is a moisture receiving device or pan 10 which has upturned edges 11 and these edges are provided with the moisture deflecting parts 12 which are embedded in the insulation. There is a sufficient space 13 between the upturned edges of the pan and the liner so as to permit the condensed moisture to flow down into the receptacle or pan 10. There is a discharge pipe 14 through which water from the pan is discharged to the outside of the body.

The interior of the truck may be cooled by any desired cooling apparatus and I have illustrated therein cooling plates 16 which may be cooled by any suitable means, such as are now in use for this purpose. These cooling plates may be placed in any desired position and may be supported in any desired manner. For purposes of illustration, I have illustrated these plates as being supported at the top of the refrigerating space by means of supports 17. I may also provide the truck with one or more side doors 18.

The metal lining is preferably directly against the insulation so that the insulation directly engages it. When the metal lining is corrugated, the insulation when of certain types, is free to move into the grooves in the corrugated lining which faces the insulation. If the insulating material is of a firmer form, these grooves will be left open. The lining, being metal, becomes very cold and draws the greater part of the moisture entering through the insulation to it and causes this moisture to freeze into snow or ice, which forms a layer on the face of the liner, which layer gradually thickens and extends back into the insulating material and which remains on the lining and in the insulating material in this frozen condition until the temperature in the truck is raised sufficiently to melt this snow or ice, as, for example, when the truck is defrosted, whereupon the water formed by the melting of this snow and ice flows down the wall of the liner into the receptacle or pan 10. The portion of the melted ice and snow in the insulation seeps down through the insulation and is deflected by the deflecting device 12 and passes into the receptacle or pan 10. This water then escapes through the drain pipe to the outside of the truck. The drain pipe is normally closed in some manner, as by the closure 15. As before stated, the preferred construction is where the metal lining is directly against the insulation, that is, where there is nothing between the metal lining and the insulation, unless it may be an air gap, but it is of course evident that the metal lining may be used in any other way desired and in connection with any other proper intermediate device or part.

I claim:

1. A refrigerating apparatus comprising a truck body, heat insulating material on the interior of said truck body, an interior refrigerating chamber surrounded by said insulating material, and having an enclosing wall in proximity to the inner face of said insulating material, the moisture which enters from the outside of said refrigerating chamber into the insulating material becoming congealed on the side of said wall nearest to said insulating material when the refrigerating chamber is in its cooled condition, said wall at its bottom being provided with an escape opening through which the water produced by melting said congealed moisture when the truck body is defrosted, is discharged.

2. A refrigerating apparatus comprising a truck body, a heat insulating material on the interior of said truck body, an interior refrigerating chamber surrounded by said insulating material, a lining for the inner face of said heat insulating material, the moisture which enters from the outside of said refrigerating chamber into the insulating material becoming congealed on the side of said lining nearest to said insulating material and in the insulating material between said lining and the outer wall of the truck body when the refrigerating chamber is in its cooled condition, said lining at its bottom being provided with an escape opening through which the water produced by melting said congealed moisture when the truck body is defrosted, is discharged.

3. A refrigerating apparatus comprising a truck body having an outer wall, heat insulating material on the interior of the outer wall of said truck body, an interior refrigerating chamber surrounded by said insulating material, a lining for the inner face of said heat insulating material, on the face of which nearest the outer wall of the truck body moisture which enters from the outside of the truck body becomes congealed when the refrigerating chamber is in its cooled condition, a receptacle in the bottom of said truck body, and means for draining moisture into said receptacle formed by the melting of the congealed material between said lining and the outer wall of the truck when the truck is defrosted.

4. A refrigerating apparatus comprising a truck body, heat insulating material on the interior of said truck body, an interior refrigerating chamber surrounded by said insulating material, a lining for the inner face of said heat insulating material which stops the moisture that enters the insulating material from the outside of the truck body, the moisture being congealed in the insulating material when the refrigerating chamber is in its cooled condition, a receptacle in the bottom of said truck body said lining at its bottom having a discharge space which discharges the water into said receptacle due to the melting of said congealed moisture in said insulating material when the truck body is defrosted.

5. A refrigerating apparatus comprising a truck body, heat insulating material on the interior of said truck body, an interior refrigerating chamber surrounded by said insulating material, a lining for the inner face of said heat insulating material, a receptacle in the bottom of said truck body, and a deflecting device at the edge of said receptacle projecting into said insulating material, for deflecting into said receptacle condensed moisture seeping down through said insulating material.

6. A refrigerating apparatus comprising a truck body, heat insulating material on the interior of said truck body, an interior refrigerating chamber surrounded by said insulating material, a metal lining for the inner face of said heat insulating material which stops the moisture that enters the insulating material from the outside of the truck body, the moisture being congealed in the insulating material when the refrigerating chamber is in its cooled condition, said lining formed into removable sections, fastening means for removably fastening said sections of the lining in position on the inner face of said insulating material and means for draining the water from said insulating material between the lining and the outer wall of the truck body when the congealed moisture is melted when the truck body is defrosted.

7. A refrigerating apparatus comprising a truck body, heat insulating material on the interior of said truck body, an interior refrigerating chamber surrounded by said insulating material, a metal lining for the inner face of said heat insulating material which stops the moisture that enters the insulating material from the outside of the truck body, the moisture being congealed in the insulating material when the refrigerating chamber is in its cooled condition, said lining formed into sections and directly engaging the insulating material, fastening means for fastening said sections of the lining in position on the inner face of said insulating material and means for draining the water from said insulating material between the lining and the outer wall of the truck body when the congealed moisture is melted when the truck body is defrosted.

8. A refrigerating apparatus comprising a truck body, heat insulating material on the interior of said truck body, an interior refrigerating chamber surrounded by said insulating material, supporting members extending along said insulating material, a metal lining for the inner face of said insulating material which stops the moisture that enters the insulating material from the outside of the truck body, the moisture being congealed in the insulating material when the refrigerating chamber is in its cooled condition, and means for exposing the inner face of the insulation to direct contact with drying air when the truck is being defrosted, so as to dry the insulation whereby the efficiency and the life of the trucks are increased.

9. A refrigerating apparatus comprising a truck body having an outer wall, spaced frame members on the inside of said wall, heat insulating material between said spaced frame members, and between said spaced frame members and the outer wall of the truck body, an interior refrigerating chamber surrounded by said insulating material, a lining for said refrigerating chamber, made up into sections, which stops the moisture that enters the insulating material from the outside of the truck body, the moisture being congealed in the insulating material when the refrigerating chamber is in its cooled condition and means for removing the moisture from the insulation between the refrigerating chamber and the outer wall of the truck when the truck is being defrosted.

LEONEL A. DE MORE.